(12) United States Patent  (10) Patent No.: US 7,901,142 B2
Mathis  (45) Date of Patent: Mar. 8, 2011

(54) DIAPHRAGM BEARING HANGER ASSEMBLY

(75) Inventor: Jeffrey L. Mathis, Clinton, NY (US)

(73) Assignee: Goodrich Corporation, Charlotte, NC (US)

( * ) Notice: Subject to any disclaimer, the term of this patent is extended or adjusted under 35 U.S.C. 154(b) by 861 days.

(21) Appl. No.: 11/725,858

(22) Filed: Mar. 20, 2007

(65) Prior Publication Data

US 2008/0232730 A1  Sep. 25, 2008

(51) Int. Cl.
F16C 27/00 (2006.01)
F16C 27/04 (2006.01)

(52) U.S. Cl. ........................................ 384/535; 384/581

(58) Field of Classification Search .................. 384/535, 384/536, 581, 582, 904; 180/381; 464/178, 464/182

See application file for complete search history.

(56) References Cited

U.S. PATENT DOCUMENTS

| 2,563,980 | A | * | 8/1951 | Wahlberg | 384/536 |
|---|---|---|---|---|---|
| 3,053,584 | A | * | 9/1962 | Dunn | 384/536 |
| 3,306,680 | A | * | 2/1967 | Bruyere | 384/536 |
| 3,531,949 | A | * | 10/1970 | Downey | 464/80 |
| 4,648,475 | A | * | 3/1987 | Veglia | 180/297 |
| 5,158,504 | A |   | 10/1992 | Stocco |  |
| 5,314,255 | A | * | 5/1994 | Schwerdt | 384/536 |
| 6,634,793 | B2 | * | 10/2003 | Zimmermann | 384/536 |
| 6,948,857 | B2 | * | 9/2005 | Schuetz | 384/498 |

* cited by examiner

*Primary Examiner* — James Pilkington
(74) *Attorney, Agent, or Firm* — Scott D. Wofsy; Edwards Angell Palmer & Dodge LLP (57) ABSTRACT

A bearing hanger assembly for coupling rotating shaft components is disclosed which includes a mounting assembly for mounting the bearing hanger assembly to a supporting structure, a bearing assembly for supporting axial rotation of coupled shaft components, and a flexible diaphragm plate supported by the mounting assembly and operatively connected to the bearing assembly so as to accommodate misalignment of the coupled shaft components relative to the supporting structure.

9 Claims, 14 Drawing Sheets

DIAPHRAGM BEARING HANGER ASSEMBLY

BACKGROUND OF THE INVENTION

1. Field of the Invention

The subject invention is directed to a bearing hanger assembly for rotating shaft components, and more particularly, to a bearing hanger assembly for use in aircraft, marine and industrial drive systems to couple a driving shaft and a driven shaft in a manner that accommodates misalignment of the shaft components relative to a supporting structure.

2. Description of Related Art

Bearing hangers for coupling two shafts such as a driving shaft and a driven shaft, which transmit torque while accommodating axial and/or angular misalignment of the shafts relative to a supporting structure have long been used in aircraft, marine and industrial applications. Many of these prior art devices have employed elastomeric, visco-elastic and/or spherical bearing elements to accommodate shaft extension and misalignment. Other prior art coupling devices have used one or more contoured diaphragms to accommodate shaft extension and misalignment. For example, U.S. Pat. No. 5,158,504 to Stocco describes a device that uses contoured diaphragms welded together to form a flexible coupling between a driving shaft and a driven shaft.

In the past, prior art coupling diaphragms have been designed with torque transmission as a primary design consideration and flexibility as a secondary design consideration. However, there are applications in which torque transmission requirements are more easily achieved and the flexibility requirement becomes the prime design factor, such as in aircraft and industrial drive systems. Typically, in such instances, the flexibility feature of the diaphragm is incorporated in its cross-sectional profile, as disclosed for example in U.S. Pat. No. 5,158,504 to Stocco.

It is known in the art that that the torque transmitting capacity of a flexible diaphragm varies as the reciprocal of the square of its radius. For that reason, in prior art devices, the thinnest section of the diaphragm has been nearest to the outer periphery thereof. However, this generates high stresses in the outer peripheral area under axial deflection or bending conditions resulting from angularly misaligned shafts.

The subject invention provides a bearing hanger that employs a flexible diaphragm with a profile that enables the diaphragm to accommodate axial deflections without overstressing the diaphragm material. In order to accommodate this condition the diaphragm is thinnest in areas where the diaphragm stress will be low. Furthermore, the profile of the diaphragm takes into account the torque transmission requirements and the buckling stability of the coupling.

In the subject invention, the diaphragm profile is preferably optimized so that the bending moment developed by axial and angular deflections is small at the thinnest section of the contoured profile. This ensures that stress levels are minimal throughout the diaphragm. Consequently, greater axial deflection and bending can be accommodated before the diaphragm material reaches its endurance limit.

SUMMARY OF THE INVENTION

The subject invention is directed to a new and useful bearing hanger assembly for use in an aircraft, marine or industrial drive system to couple and support a driving shaft and a driven shaft. The bearing hanger assembly of the subject invention includes a mounting assembly for connecting the bearing hanger to a supporting structure, a bearing assembly for accommodating or otherwise supporting axial rotation of coupled shaft components, and a flexible diaphragm plate that is supported by the mounting assembly and operatively connected to the bearing assembly so as to accommodate axial and/or angular misalignment of the rotating shaft components relative to the supporting structure.

In accordance with the subject invention, the bearing assembly has an inner race and an outer race with one or more sets of spherical ball bearings running therebetween. The mounting assembly includes opposing bracket portions that are adapted and configured to mount the bearing hanger assembly to a supporting structure, such as a bulkhead in the airframe of a helicopter. The diaphragm plate is a solid flexible structure that is disposed between the opposing bracket portions of the mounting assembly. The diaphragm plate has a radially outer peripheral rim portion, a radially inner peripheral hub portion and a contoured medial portion having a dual tapered profile that is dimensioned and configured to allow for bending and deflection resulting from the axial and/or angular misalignment of the rotating shaft components relative to a supporting structure.

In one embodiment of the invention, the radial inner peripheral hub portion of the diaphragm plate is operatively connected to the outer race of the bearing assembly. In this configuration, the radially outer peripheral rim portion of the diaphragm plate is operatively connected to the mounting assembly, and the inner race of the bearing assembly is operatively connected to a flanged shaft coupling. The flanged shaft coupling is adapted and configured to couple together a driving shaft and a driven shaft.

In another embodiment of the invention, the radially outer peripheral rim portion of the diaphragm plate is operatively connected to the inner race of the bearing assembly. In this configuration, the inner peripheral hub portion of the diaphragm plate is operatively connected to a flanged shaft coupling adapted and configured to couple together a drive shaft and a driven shaft, and the outer race of the bearing assembly is operatively connected to the mounting assembly.

These and other features of the bearing hanger assembly of the subject invention and the manner in which it is employed to accommodate shaft misalignment relative to a supporting structure will become more readily apparent to those having ordinary skill in the art from the following enabling description of the preferred embodiments of the subject invention taken in conjunction with the several drawings described below.

BRIEF DESCRIPTION OF THE DRAWINGS

So that those skilled in the art to which the subject invention appertains will readily understand how to make and use the bearing hanger assembly of the subject invention without undue experimentation, preferred embodiments thereof will be described in detail hereinbelow with reference to certain figures, wherein.

DETAILED DESCRIPTION OF PREFERRED EMBODIMENTS

Figure 1:
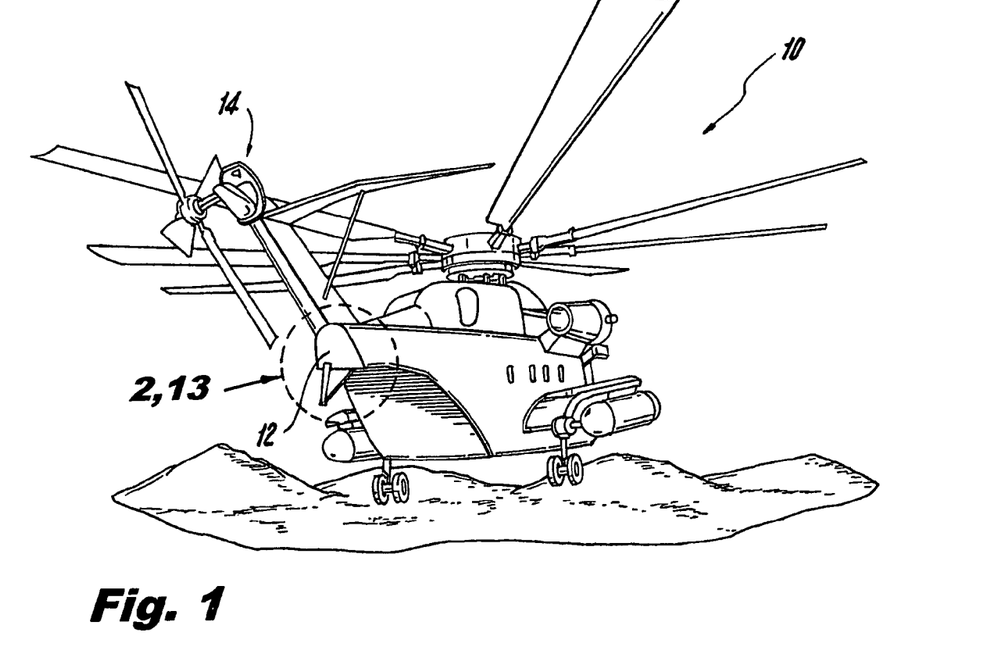
FIG. 1 is a perspective view of a helicopter having a tail rotor assembly in which the diaphragm bearing hanger of the subject invention is deployed to system to couple a driving shaft and a driven shaft.

Referring now to the drawings wherein like reference numerals identify similar features or elements of the various embodiments of the subject invention disclosed herein, there is illustrated in FIG. 1 a helicopter 10 having a foldable tail section 12 in which the diaphragm bearing hanger assembly 100 of the subject invention is employed. In particular, the bearing hanger assembly 100 serves as a coupling between two rotating drive shaft components, while accommodating angular and/or axial misalignment of the shaft components relative to the airframe, within the tail rotor assembly 14 of helicopter 10, as shown in FIG. 2.

Those skilled in the art will readily appreciate that the bearing hanger assembly 100 of the subject invention may also be employed within the input drive system of a helicopter or in other aircraft applications including, for example, tilt-rotor applications. The bearing hanger assembly of the subject invention may also be employed in industrial drive systems such as petrochemical systems, power generation and marine propulsion applications.

Figure 2:
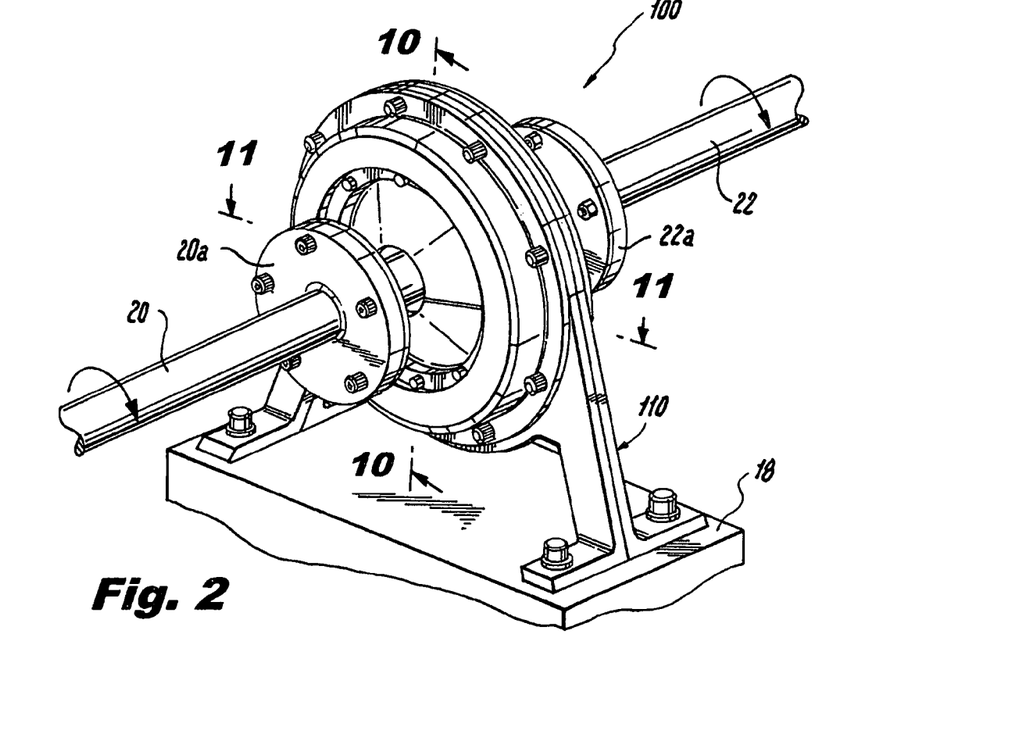
FIG. 2 is a perspective view of a preferred embodiment of the diaphragm bearing hanger of the subject invention, fastened to a bulkhead structure in the airframe of the helicopter of FIG. 1, and coupling a driving shaft and a driven shaft in a manner that accommodates angular and/or axial misalignment of the shafting relative to the supporting bulkhead structures of the airframe.

Referring to FIG. 2, bearing hanger assembly 100 is shown mounted to a bulkhead structure 18 in the tail section 12 of helicopter 10. Bearing hanger 100 serves to couple a first flanged shaft section 20 to a second flanged shaft section 22 of a drive shaft assembly, and more particularly to accommodate any angular or axial misalignment of the two shaft sections relative to the airframe, which can arise, for example, from structural deflection or misalignment in the tail section 12 of the helicopter 10, such as in the vertical pylon that supports the tail rotor.

Figure 3:
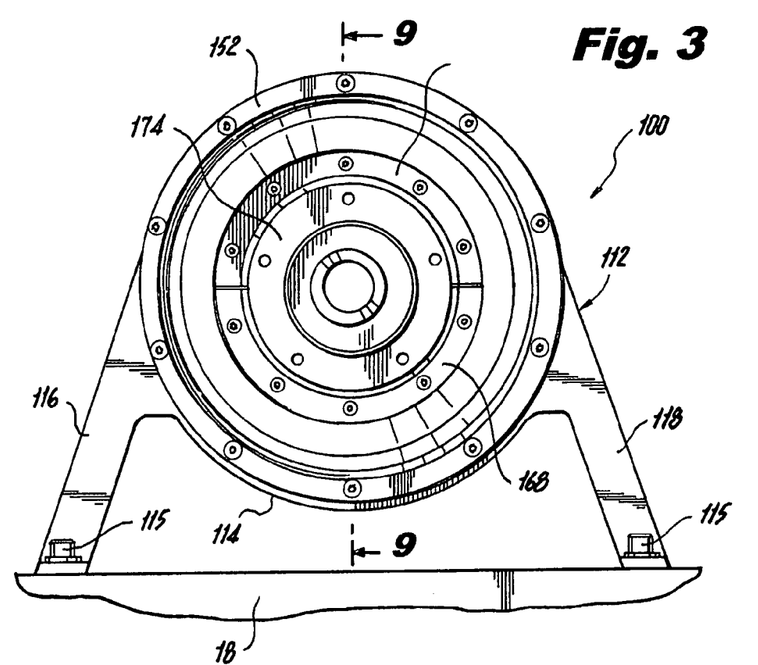
FIG. 3 is a front plan view of the diaphragm bearing hanger of FIG. 2, illustrating the structure to which the driving shaft is coupled.

The structural provisions for operatively connecting the flanged end 20a of drive shaft section 20 to bearing hanger assembly 100 are shown in FIG. 3 and will be discussed in greater detail below. Similarly, the structural provisions for operatively connecting the flanged end 22a of driven shaft section 22 to bearing hanger assembly 100 are generally shown in FIG. 4, and will be described in greater detail hereinbelow.

Figure 4:
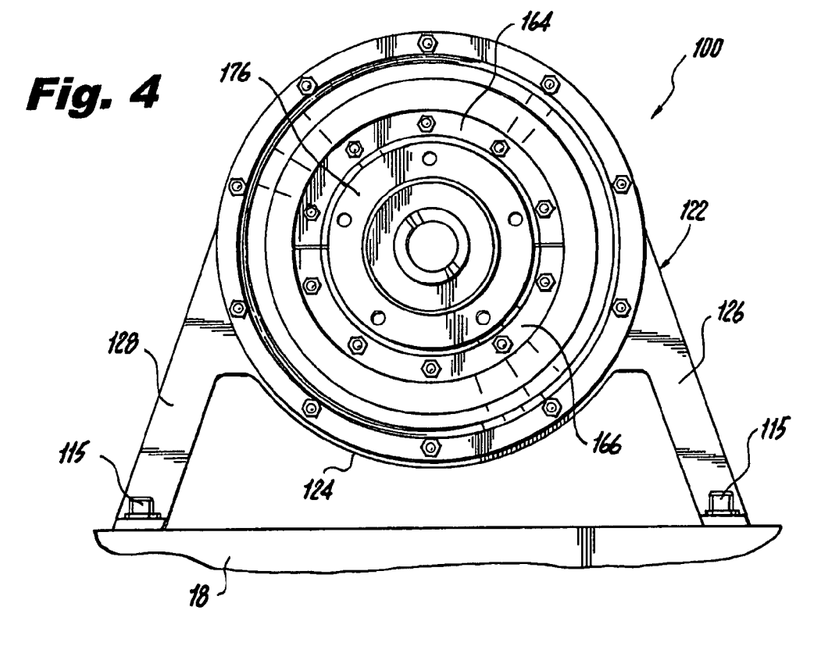
FIG. 4 is a rear plan view of the diaphragm bearing hanger of FIG. 2, illustrating the structure to which the driven shaft is coupled.
Figure 5:
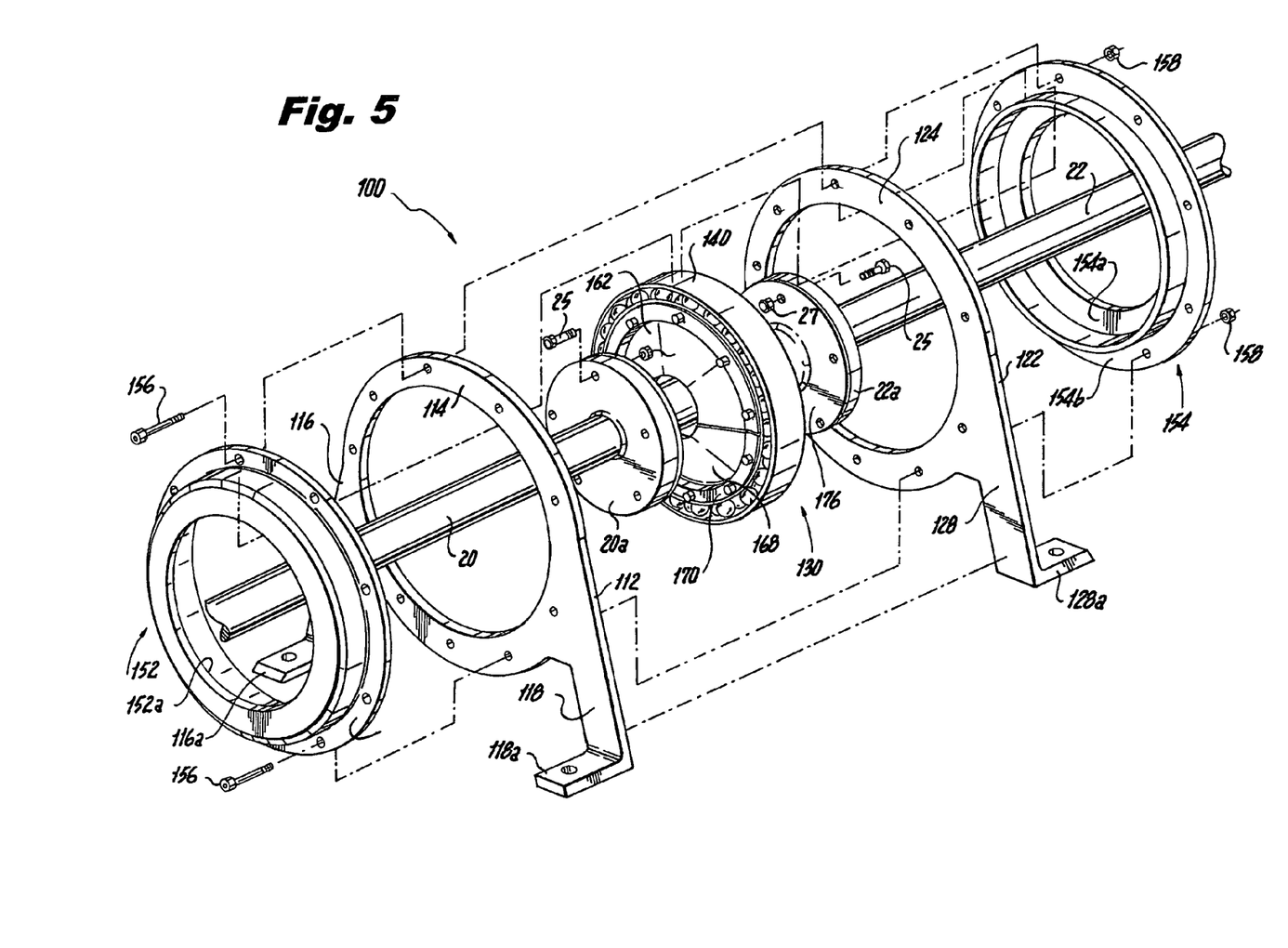
FIG. 5 is an exploded perspective view of the diaphragm bearing hanger of FIG. 2, with parts separated for ease of illustration.

Referring now to FIG. 5 in conjunction with FIGS. 3 and 4, bearing hanger assembly 100 includes a mounting assembly 110 consisting of two mounting brackets 112, 122 that are adapted and configured to mount the bearing hanger assembly 100 to a supporting structure, such as the bulkhead 18 in the airframe of a helicopter, which is shown in FIG. 2. The mounting brackets 112, 122 of mounting assembly 110 are preferably constructed from aluminum or a similar lightweight material to reduce the overall weight of the assembly. Mounting bracket 112 includes a main support ring section 114 with integral support legs 116 and 118. Mounting feet 116a and 118a extend respectively from support legs 116 and 118 for receiving threaded bolts 115 that secure the bracket mounting 112 to a bulkhead. Similarly, mounting bracket 122 includes a main support ring section 124 and integral support legs 126 and 128, with respective mounting feet 126a and 128a for receiving bolts 115.

Figures 6, 7:
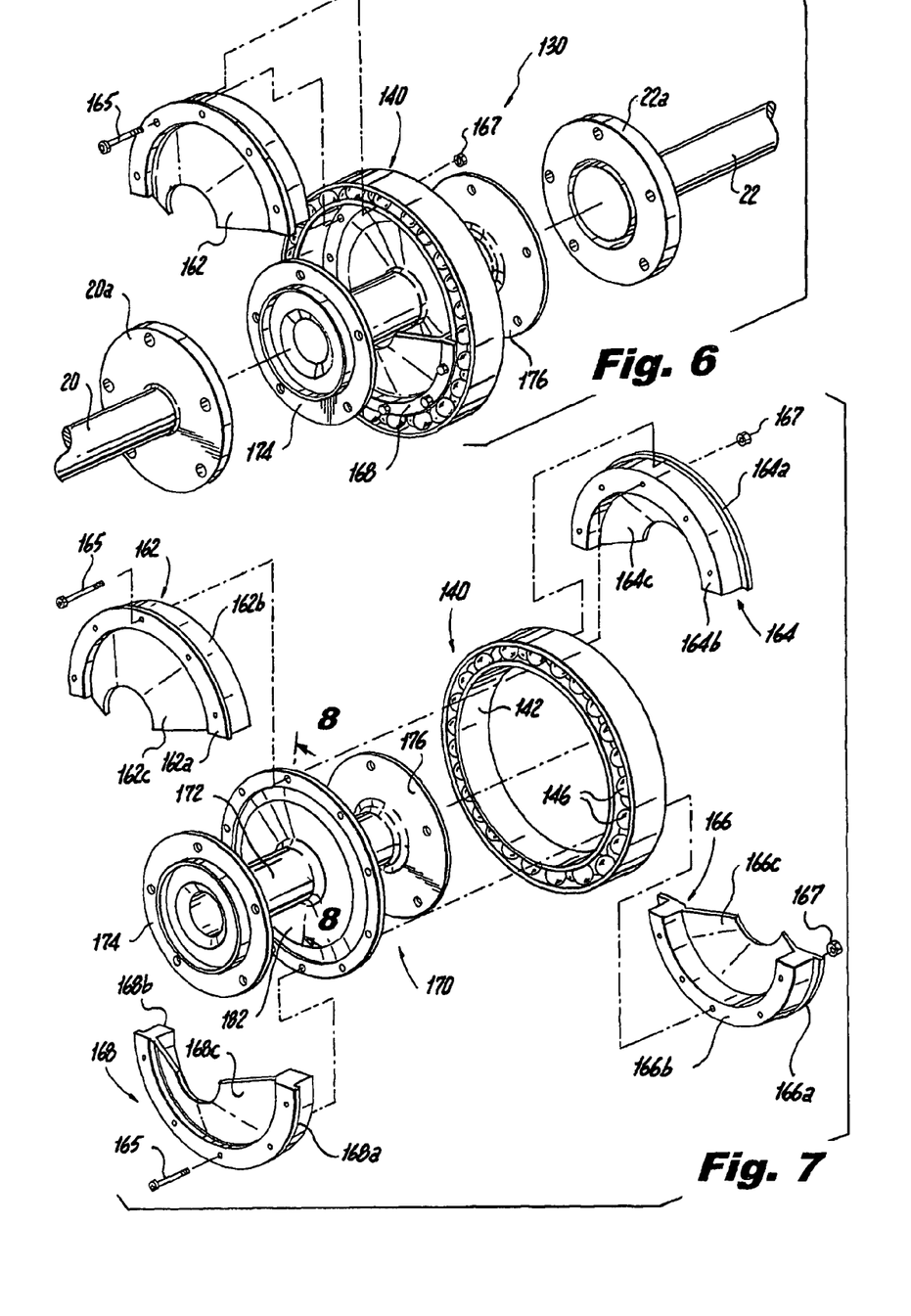
FIG. 6 is a perspective view of the flexure assembly of the bearing hanger of FIG. 2, with parts separated to illustrate the flex unit and bearing assembly thereof.
FIG. 7 is an exploded perspective view of the flexure assembly of the bearing hanger of FIG. 2, with additional parts separated parts separated to further illustrate the flex unit and bearing assembly thereof.

With continuing reference to FIG. 5, bearing hanger assembly 100 further includes a flexure assembly 130 that consists of a bearing assembly 140 and a flex unit 170. The bearing assembly 140 of flexure assembly 130 supports or otherwise accommodates the axial rotation of the flex unit 170. As explained in more detail below, flex unit 170 includes a contoured flexible diaphragm plate 180 that accommodates axial and/or angular misalignment of the shafting 12, 22, relative to the airframe, as shown for example in FIGS. 10 and 11. Referring to FIGS. 6 and 7, the bearing assembly 140 of flexure assembly 130 is an integral roller bearing type assembly that includes an annular inner race 142 and an annular outer race 144. Two sets of spherical ball bearings 146 run in tandem within tracks (not shown) formed between the opposing surfaces of the inner race 142 and outer race 144.

Figure 9:
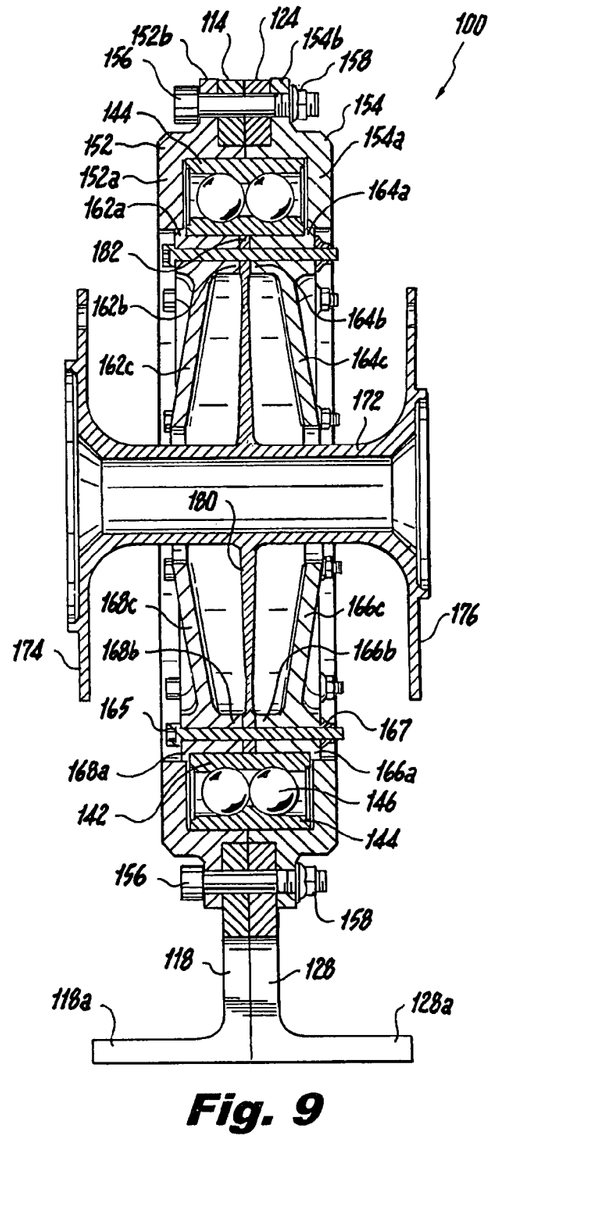
FIG. 9 is a cross-sectional view of the diaphragm bearing hanger of the subject invention taken along line 9-9 of FIG. 3, illustrating the structural relationship between the component parts thereof.

With continuing reference to FIG. 5, bearing hanger assembly 100 further includes two opposed housing portions 152 and 154 that are configured to rigidly clamp together around the outer race 144 of bearing assembly 140. In doing so, the two housing portions 152, 154 also attach the bearing assembly 140 to the two mounting brackets 112 and 122, as best seen in FIG. 9. In this regard, a set of circumferentially spaced apart mounting bolts and nuts 156 and 158 are provided for fastening the two bearing housing portions 152 and 154 to one another. This is done in such a manner so as to compressively engage the outer race 144 of bearing assembly 140 between the respective outer bearing walls 152a and 154a of housing portions 152 and 154, as shown in FIG. 9.

In addition, the main support rings 114 and 124 of mounting brackets 112 and 122 are compressively sandwiched, in face-to-face relationship, between the respective upper bearing walls 152b and 154b of housing portions 152 and 154, under the load of mounting bolts 156. As a consequence of this mechanical construct, the outer race 144 of bearing assembly 140 is held stationary with respect to the inner race 142 of bearing assembly 140.

Referring to FIGS. 6 and 7, four generally semi-circular mounting ring sections 162, 164, 166 and 168 are configured to clamp around the inner race 142 of bearing assembly 140, as best seen in FIG. 9. To accomplish this, the outer periphery of each ring section 162, 164, 166 and 168 is formed with a respective upturned lip 162a, 164a, 166a and 168a that engages the inner race 142 of bearing assembly 140. In addition, each ring section 162, 164, 166 and 168 has a respective bearing face 162b, 164b, 166b and 168b that abuts the outer peripheral rim section 182 of the diaphragm plate 180 of flex unit 170. A set of mounting bolts and nuts 165 and 167 are provided for compressively fastening the mounting ring sections 162, 164, 166 and 168 to one another, with the inner race 142 of bearing assembly 140 and the outer rim section 182 of diaphragm plate 180 therebetween. In essence, the compressive loading of bolts 165 provides a rigid connection between the inner race 142 of bearing assembly 140 and the flexible diaphragm plate 180 of flex unit 170. As a consequence of this mechanical construct, the inner race 142 of bearing assembly 140 will rotate relative to the stationary outer race 144 of bearing assembly 140 together with flex unit 170, driven by driving shaft 20.

In addition to compressively capturing the inner race 142 of bearing assembly 140 and the outer rim section 182 of diaphragm plate 180, the four mounting ring sections 162, 164, 166 and 168 are each formed with a generally frustum-shaped cowling section 162c, 164c, 166c and 168c that is adapted and configured to protect the underlying flexible diaphragm plate 180.

Figure 8:
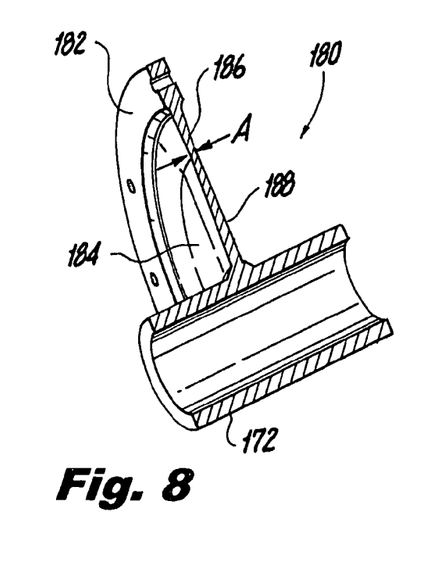
FIG. 8 is a cross-sectional view of the flexible diaphragm of the flex unit which forms part if the flexure assembly shown in FIG. 7, illustrating the dual tapered contour of the diaphragm plate.

Referring now to FIGS. 7 through 9, the flex unit 170 of flexure assembly 130 is defined by a main tubular body portion 172 having opposed coupling flanges 174 and 176. Coupling flange 174 is adapted and configured for cooperative engagement with the flanged end 20a of driving shaft 20 by a set of bolts 25 and nuts 27, while coupling flange 176 is adapted and configured for cooperative engagement with the flanged end 22a of driven shaft 22 by a set of bolts and nuts 25 and 27, as shown for example in FIGS. 2 and 10. The flexible diaphragm plate 180 of flex unit 170 is welded to or otherwise integrally formed or machined with the main tubular body portion 172 of flex unit 170. Diaphragm plate 180 is a solid flexible structure that has an outer peripheral rim section 182 having a plurality of circumferentially spaced apart apertures for receiving the mounting bolts 165 that are associated with mounting ring sections 162, 164, 166 and 168, as discussed above.

As best seen in FIG. 8, the diaphragm plate 180 of flex assembly 170 further includes a dual-tapered contoured section 184 that extends between the outer rim section 182 and the inner tubular body portion 172. The contoured section 184 of diaphragm plate 180 includes a radially outer region 186 that extends or otherwise tapers radially inwardly from the outer rim section 182 with a radially inwardly decreasing thickness running toward an area or region near or proximate to the middle of the contoured section 184. The contoured section 184 of diaphragm plate 180 further includes a radially inner region 188 that extends or otherwise tapers radial inwardly to the main tubular body portion 172 with a radially inwardly increasing thickness leading away from an area or region near or proximate to the middle of the contoured section 184.

Figure 10:
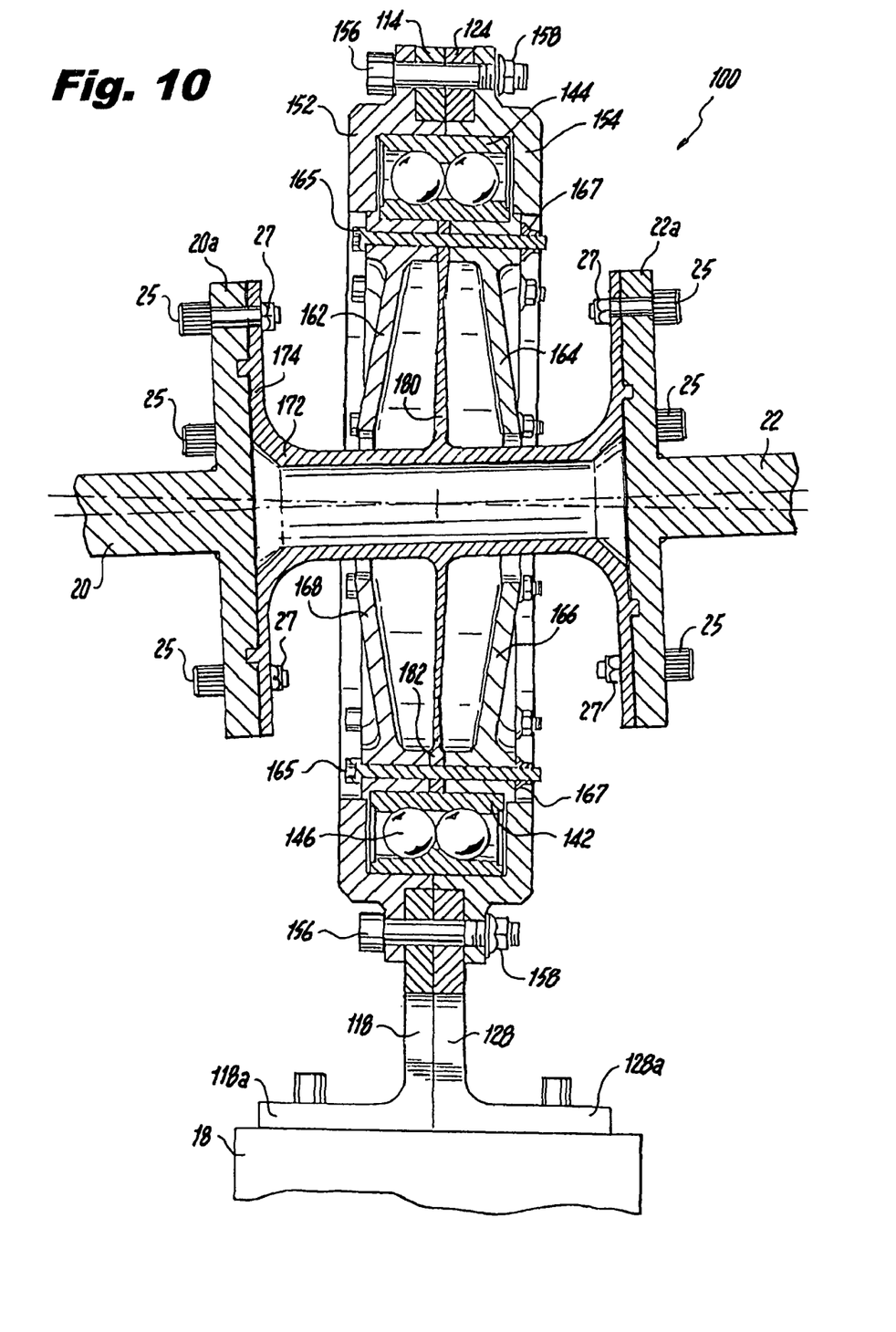
FIG. 10 is a cross-sectional view of the diaphragm bearing hanger of the subject invention, taken along line 10-10 of FIG. 2, illustrating angularly displacement of the shafting in a vertical plane relative to the aircraft bulkhead, accommodated by the flexible diaphragm plate of the flexure assembly.
Figure 11:
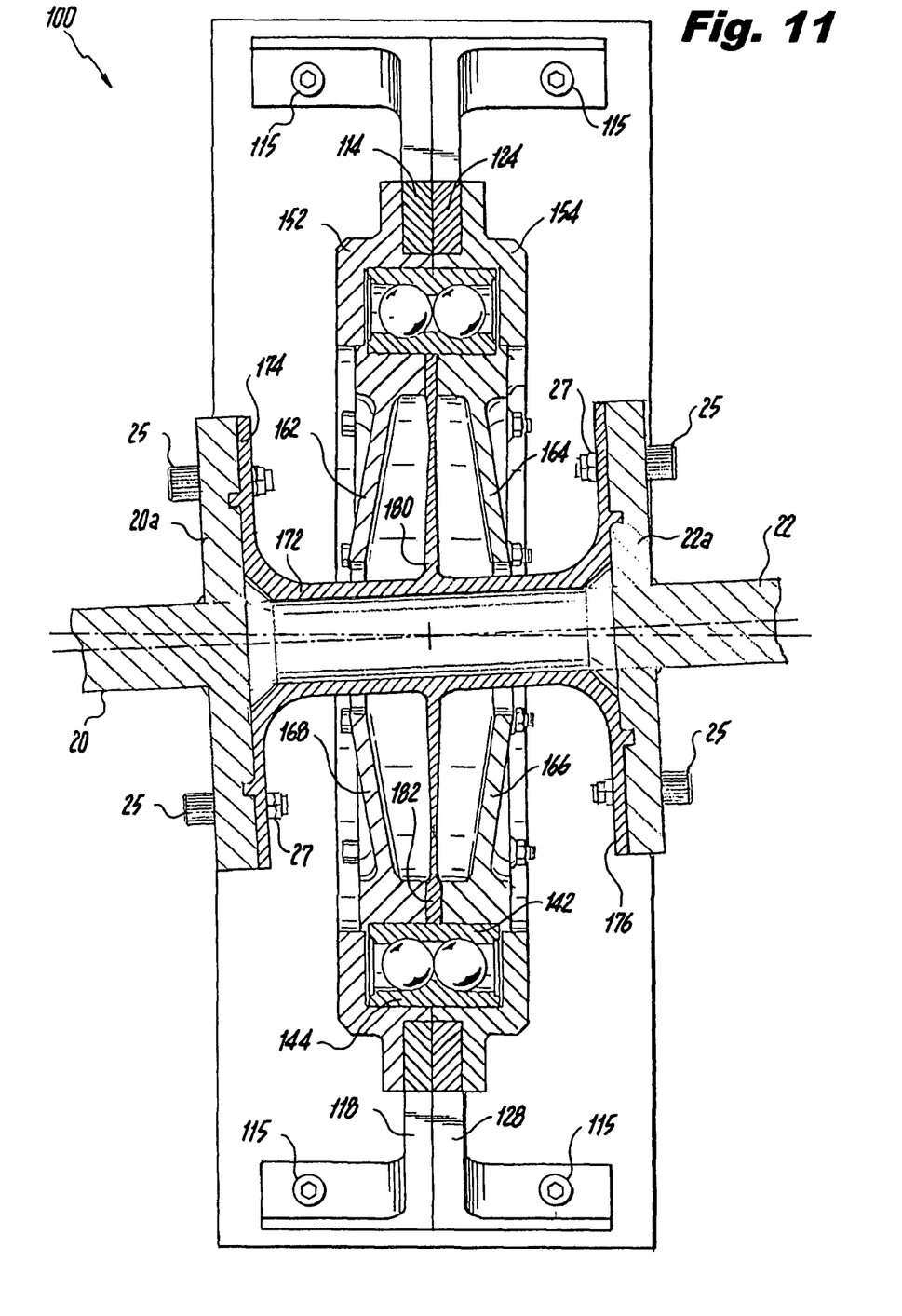
FIG. 11 is a cross-sectional view of the diaphragm bearing hanger of the subject invention, taken along line 11-11 of FIG. 2, illustrating angularly displacement of the shafting in a horizontal plane relative to the aircraft bulkhead, accommodated by the flexible diaphragm plate of the flexure assembly.

With the cross-sectional profile of the diaphragm plate 180 shown in FIG. 8, the bending moment developed by deflections of the plate as a result of angularly misaligned shafting caused by airframe deflections or the like, as shown for example in FIGS. 10 and 11, is minimum at the thinnest section "A" of the profile or near the center of the diaphragm plate 180 and stress levels are kept minimal throughout the diaphragm. Consequently, greater axial deflection or bending can be accommodated by such profiles before the fatigue endurance limit of the diaphragm material is reached. Thus, the diaphragm contours can be optimized to determine the particular location and the thickness of the profile near the central region of the diaphragm, the inner and outer radii of the diaphragm and the ratio of thickness at the inner and outer radii, as disclosed in U.S. Pat. No. 5,158,504, the disclosure of which is incorporated herein by reference in its entirety.

The dual-tapering diaphragm plate shown in FIG. 8, provides an added benefit to accommodate angular misalignment of shafting relative to the airframe, in that the stress rise in going from the outer rim section 182 to the main body portion 172 is minimal. Further, the inwardly decreasing taper of the outer region 186 is less than the inwardly increasing taper of the inner region 188 so that the stress at the central main tubular portion 172 is the same as the stress at circumferential outer rim section 182. This is true whether the diaphragm plate 180 is deflected to accommodate accommodates angular shaft misalignment in a vertical plane as shown in FIG. 10, or in a horizontal plane as shown in FIG. 11.

Figure 12:
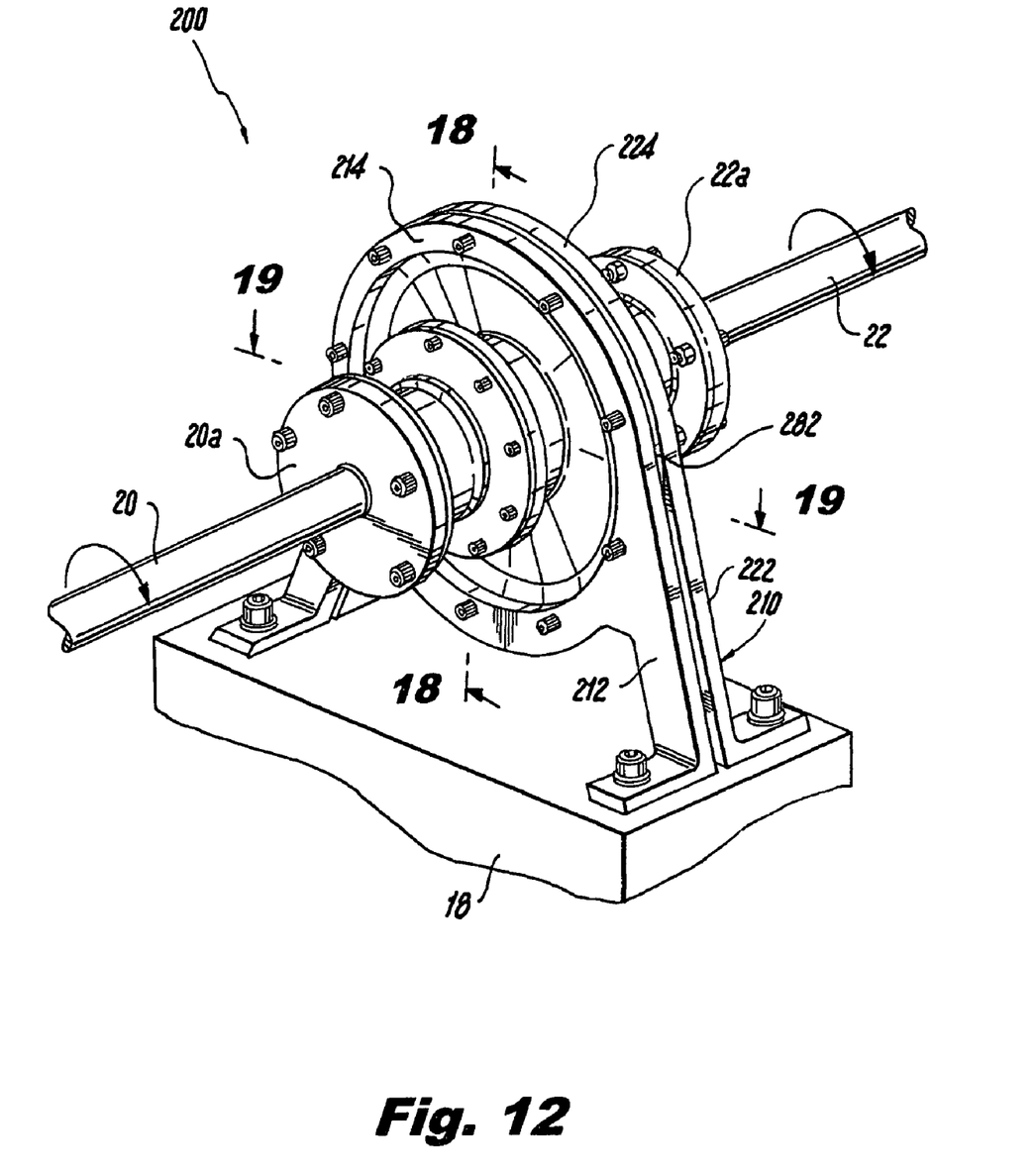
FIG. 12 is a perspective view of another preferred embodiment of the diaphragm bearing hanger of the subject invention, fastened to a bulkhead in the airframe of the helicopter of FIG. 1, and coupling a driving shaft and a driven shaft in a manner that accommodates angular and/or axial misalignment of the shafting.
Figure 13:
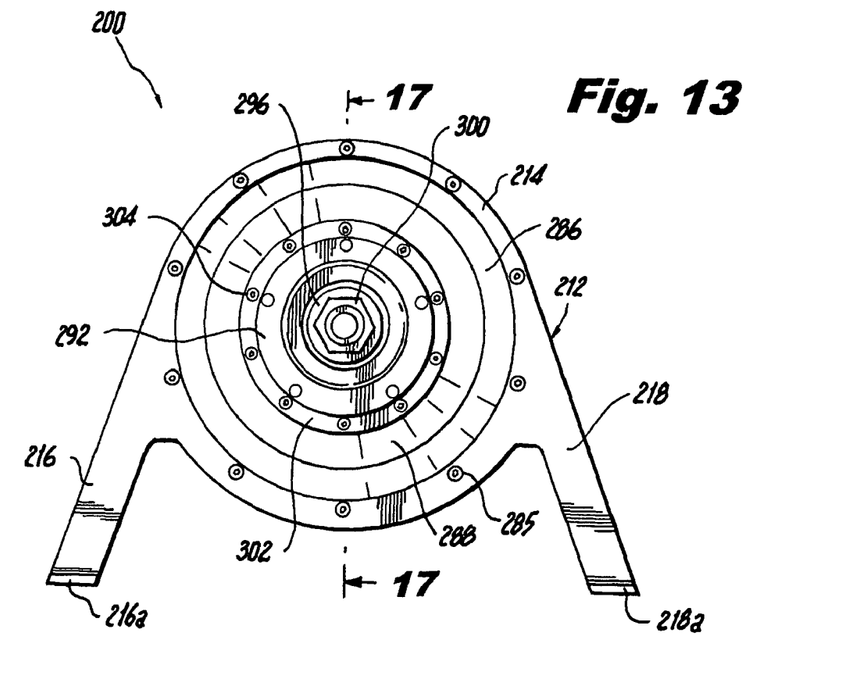
FIG. 13 is a front plan view of the diaphragm bearing hanger of FIG. 12, illustrating the structure to which the driving shaft is coupled.
Figure 14:
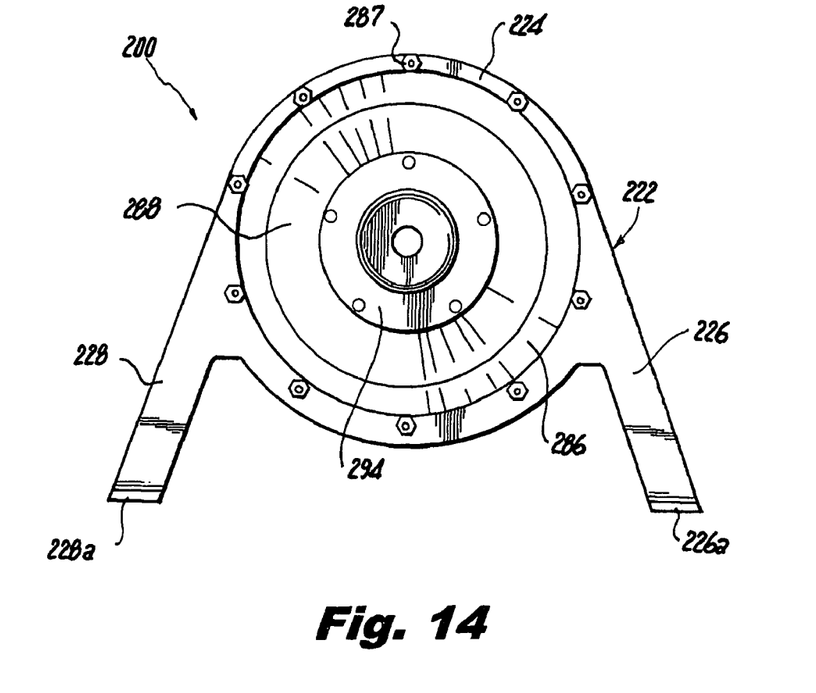
FIG. 14 is a rear plan view of the diaphragm bearing hanger of FIG. 12, illustrating the structure to which the driven shaft is coupled.

Referring now to FIG. 12, there is illustrated another bearing hanger assembly constructed in accordance with a preferred embodiment of the subject invention and designated generally by reference numeral 200. Bearing hanger assembly 200 serves to flexibly couple first flanged shaft section 20 to second flanged shaft section 22, and more particularly to accommodate any angular misalignment of the two shaft sections. The structural provisions for operatively connecting the flanged end 20a of drive shaft section 20 to bearing hanger assembly 200 are generally shown in FIG. 13, while the structural provisions for operatively connecting the flanged end 22a of driven shaft section 22 to bearing hanger assembly 200 are generally shown in FIG. 14.

Figure 15:
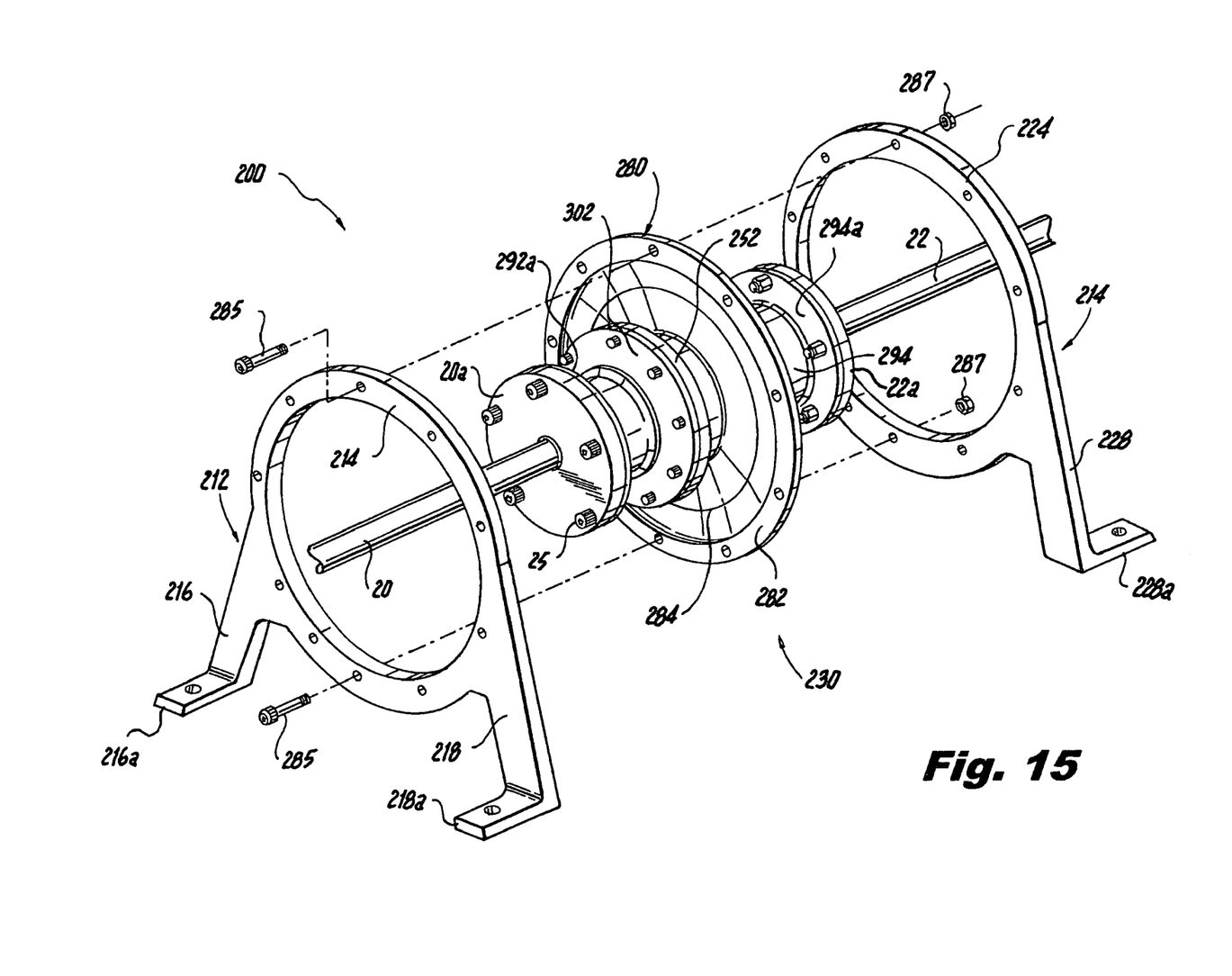
FIG. 15 is an exploded perspective view of diaphragm bearing hanger of FIG. 12, with parts separated for ease of illustration.

Bearing hanger assembly 200 includes a mounting assembly 210 consisting of two mounting brackets 212, 222 that are adapted and configured to mount the bearing hanger assembly 200 to a supporting structure, such as the bulkhead 18 in the airframe of a helicopter. As best seen in FIG. 15, mounting bracket 212 includes a main support ring section (outer support section) 214 with integral support legs 216 and 218. Mounting feet 216a and 218a extend respectively from support legs 216 and 218 for receiving threaded bolts that secure the mounting bracket 212 to a bulkhead. Similarly, mounting bracket 222 includes a main support ring section (outer support section) 224 and integral support legs 226 and 228, with respective mounting feet 226a and 228a.

Figure 16:
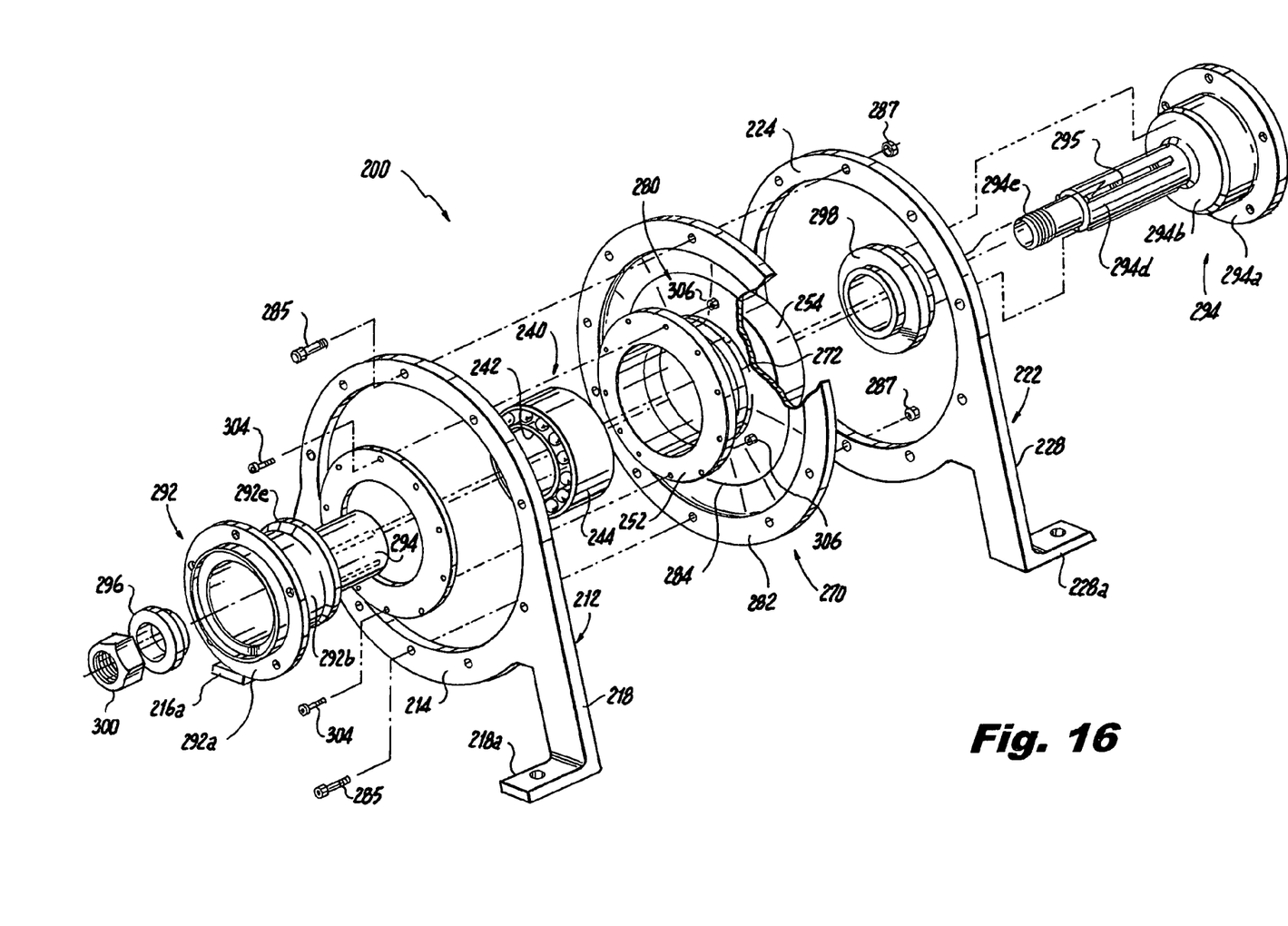
FIG. 16 is an exploded perspective view of diaphragm bearing hanger of FIG. 12, with additional parts separated for further ease of illustration.

Referring to FIGS. 15 and 16, bearing hanger assembly 200 further includes a flexure assembly 230 that consists of a bearing assembly 240 and a flex unit 270. Flexure assembly 230 differs from the flexure assembly 130 of bearing hanger 100 in that the flex unit 270 is operatively associated with the outer race 244 of the bearing assembly 240 rather than the inner race of the bearing assembly 240, as best seen in FIGS. 16 and 17.

Figure 17:
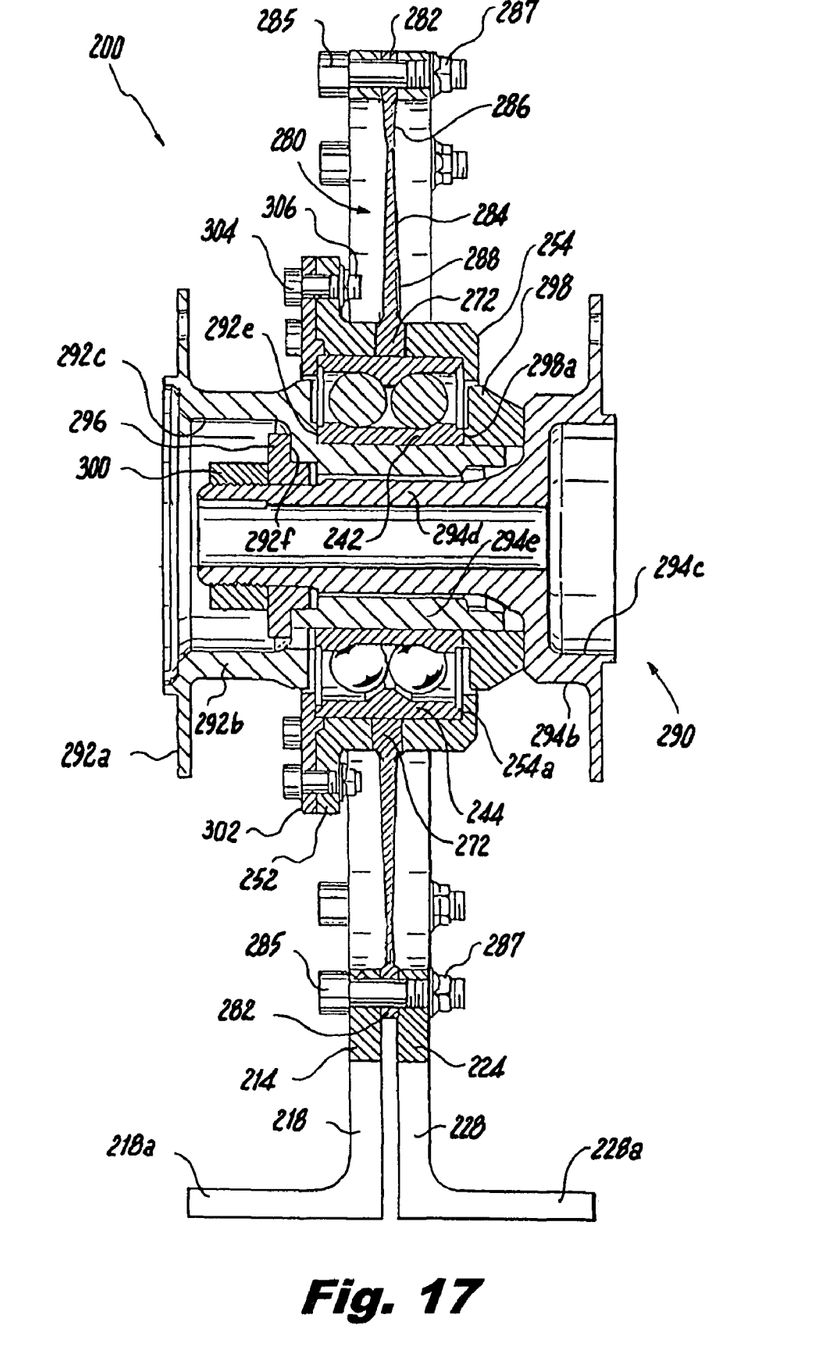
FIG. 17 is a cross-sectional view of the diaphragm bearing hanger assembly of FIG. 12, taken along line 17-17 of FIG. 13, illustrating the structural relationship between the component parts thereof.
Figure 18:
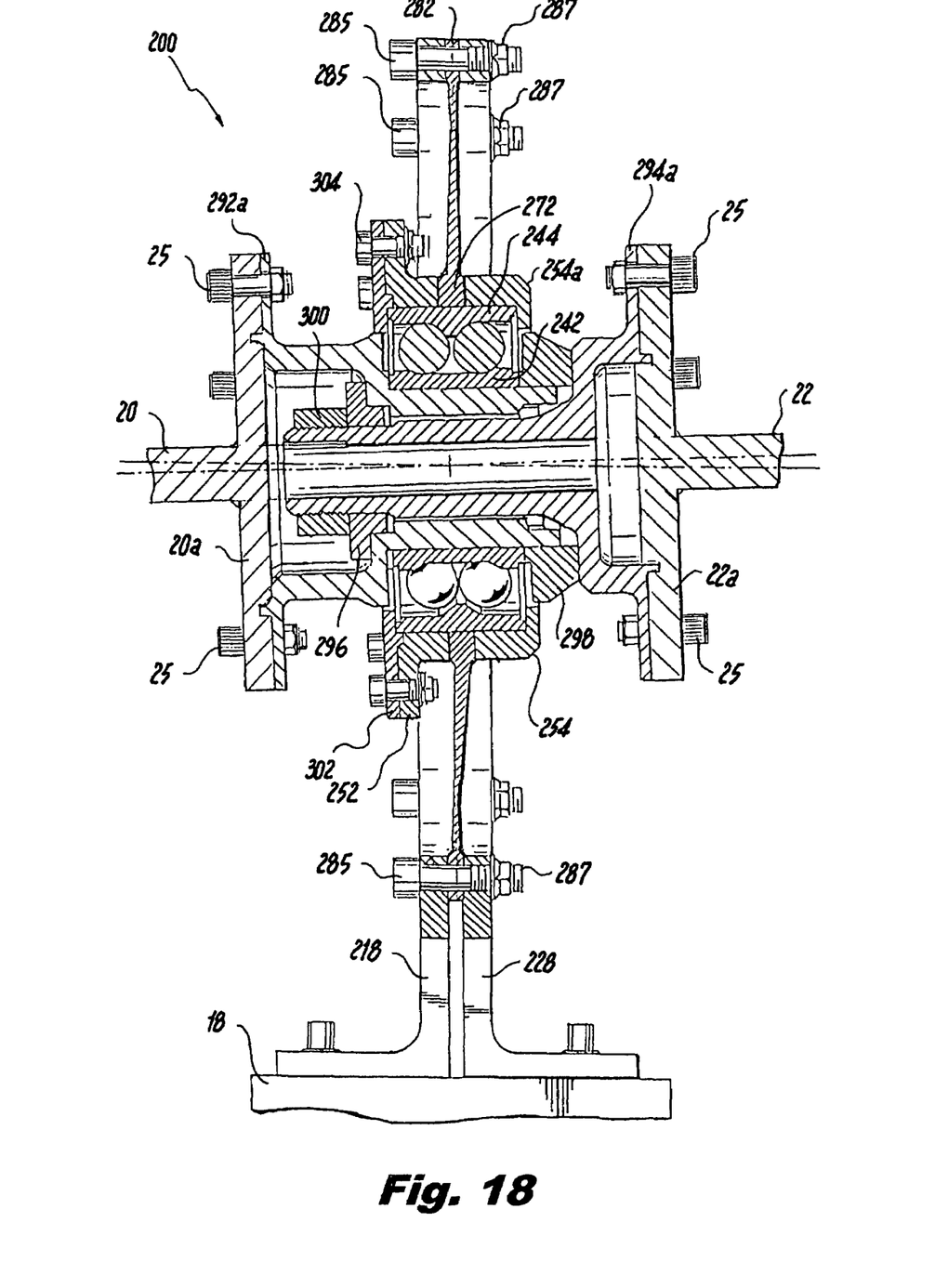
FIG. 18 is a cross-sectional view of the diaphragm bearing hanger of the subject invention, taken along line 18-18 of FIG. 12, illustrating angularly and/or axial displacement of the shafting in a vertical plane relative to the aircraft bulkhead, accommodated by the flexible diaphragm plate of the flexure assembly.

As explained in more detail below with respect to FIG. 17, as a result of this mechanical construct, the flexible diaphragm plate 280 of flex unit 270 is stationary and accommodates any angular misalignment of the drive shafting relative to a supporting structure, while the inner race 242 of bearing assembly 240 accommodates the axial rotation of a shaft coupling 290 which transmits torque from the drive shaft 20 to the driven shaft 22, as best seen in FIG. 18. In essence, the shaft coupling 290 is operatively engaged with the inner race 242 of bearing assembly 240, and thus it rotates relative to the stationary diaphragm plate 280 of flex unit 270.

Referring to FIGS. 16 and 17, the shaft coupling 290 consists of a female bearing flange portion 292, which preferably transmits torque via an internal spline 293, a male bearing flange portion 294, which preferably transmits torque via an external spline 295, an annular pilot spacer 296 associated with female bearing flange portion 292 and an annular bearing spacer 298 associated with male bearing flange portion 294.

The female bearing flange portion 292 includes an outer flange section 292a for engagement with the flanged end 20a of drive shaft 20, an annular body portion 292b having an interior cavity 292c, and an elongated stem portion 292d extending from the annular body portion 292b and having an interior bore, preferably formed with a splined interior surface. An outer bearing wall 292e is formed at the junction between the body portion 292b and the stem portion 292d, and an inner bearing wall 292f is formed within the interior of body portion 292b.

The male bearing flange portion 294 includes an outer flange section 294a for engagement with the flanged end 22a of driven shaft 22, an annular body portion 294b having an interior cavity 294c, and an elongated stem portion 294d extending from the annular body portion 294b, preferably formed with a splined exterior surface 295 for mating with the splined interior surface 293 of the stem portion 292d of female bearing flange portion 292. In addition, the distal end 294e of the stem portion 294d of male bearing flange portion 294 is threaded to cooperate with a locking nut 300. Those skilled in the art will readily appreciate that other types of mechanical connections, besides interlocking splines, can be used to facilitate the engagement between the female bearing flange potion 292 and the male bearing flange portion 294, without departing from the spirit or scope of the subject disclosure.

As noted above, the shaft coupling 290 is operatively engaged with the inner race 242 of bearing assembly 240, so as to rotate together. This operative engagement is achieved by compressively engaging the inner race 242 between the outer bearing wall 292e of female bearing flange portion 292 and the forward bearing wall 298a of bearing spacer 298, while the pilot spacer 296 is compressed against the inner bearing wall 292f of body portion 292b, by the threaded engagement of locking nut 300 on the distal end portion 294e of stem portion 294d.

With continuing reference to FIGS. 16 and 17, the flex unit 270 of flexure assembly 230 includes the diaphragm plate 280, which, like diaphragm plate 180, includes a dual-tapered contoured section 284 with tapered radially outer and radially inner regions 286 and 288. However, the contoured section 284 extends between an outer rim section 282 and an inner hub section 272. In this regard, opposed bearing housing portions 252 and 254 are welded or otherwise mechanically secured to the respective side surfaces of the inner hub section 272 of diaphragm plate 280.

As best seen in FIG. 17, housing portion 254 includes an annular bearing wall 254a that abuts one side of the outer race 244 of bearing assembly 240, and an annular end cap 302 fastened to bearing housing potion 252 that abuts the other side of the outer race 244 of bearing assembly 240. A set of circumferentially spaced apart nuts and mounting bolts 304, 306 secure the end cap 302 to bearing housing portion 252 so that the outer race 244 of bearing assembly 240 is compressively engaged between the end cap 302 and the annular wall 254a of housing portion 254. By way of this mechanical construct, the outer race 244 of bearing assembly 240 is operatively connected to diaphragm plate 280. Furthermore, the outer rim section 282 of diaphragm plate 280 is fastened to the main support ring sections 214 and 224 of mounting brackets 212 and 222 by a set of circumferentially spaced apart mounting bolts and nuts 285 and 287.

Figure 19:
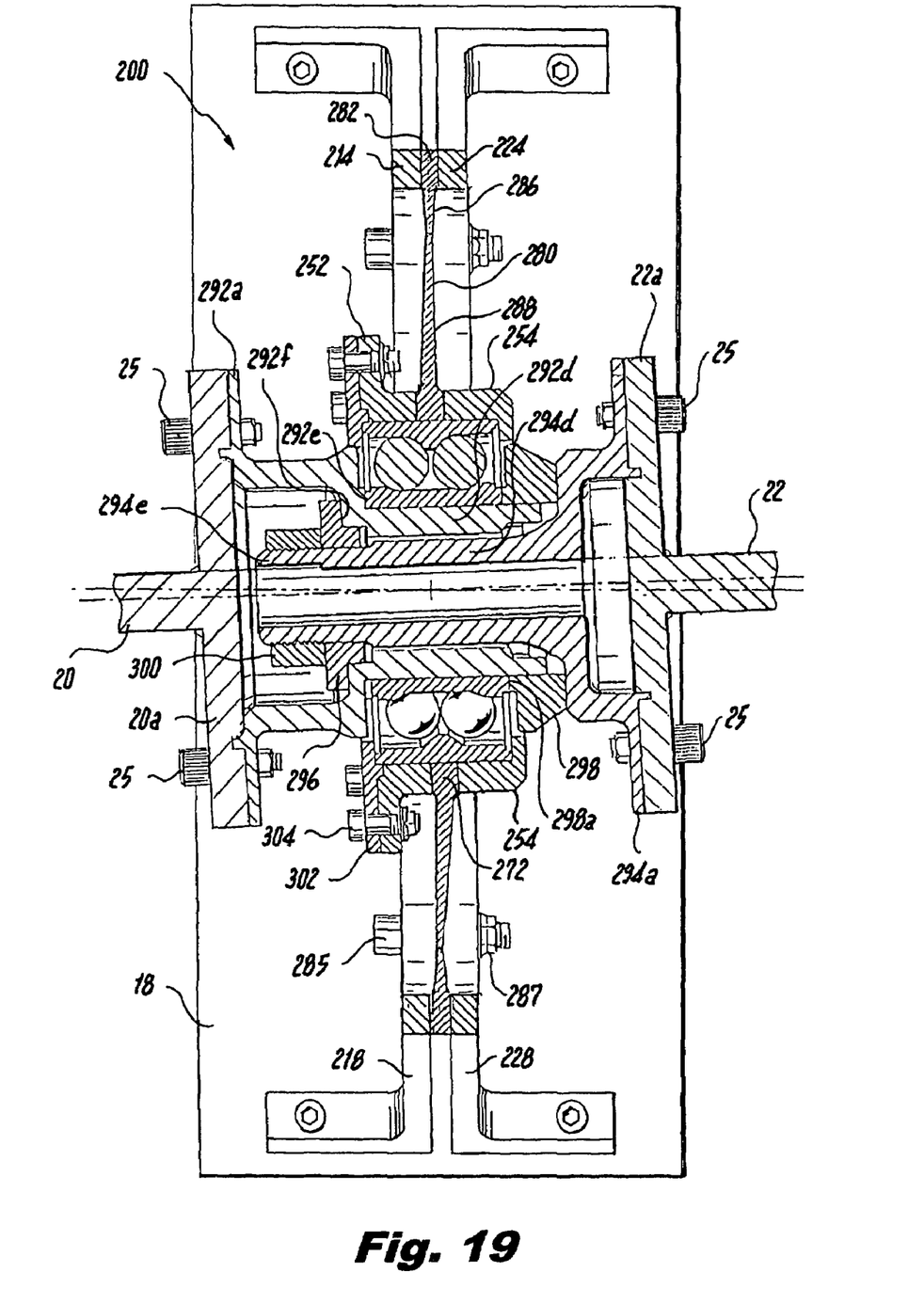
FIG. 19 is a cross-sectional view of the diaphragm bearing hanger of the subject invention, taken along line 19-19 of FIG. 12, illustrating angularly and/or axial displacement of the shafting in a horizontal plane relative to the aircraft bulkhead, accommodated by the flexible diaphragm plate of the flexure assembly.

Turning now to FIGS. 18 and 19, in conjunction with FIG. 12, when the bearing hanger assembly 200 of the subject invention is employed to couple a drive shaft 20 to a driven shaft 22, the mounting flange 20a at the end of drive shaft 20 is bolted to the outer flange section 292a of female bearing flange portion 292 by mounting bolts 25. Similarly, the mounting flange 22a at the end of driven shaft 22 is bolted to the outer flange section 294a of the male bearing flange portion 294. At such a time, the female and male bearing flange portions 292 and 294 cooperate to transmit torque between the drive shaft 20 and driven shaft 22 by mounting bolts 25.

Furthermore, any angular or axial misalignment of drive shaft 20 and driven shaft 22 caused by airframe deflection is accommodated by the optimized construction of the dual-tapered flexible diaphragm plate 280 of flex unit 270. For example, FIG. 18 illustrates how diaphragm plate 280 accommodates angular shaft misalignment in a vertical plane relative to bulkhead 18, while FIG. 19 illustrates how diaphragm plate 280 accommodates angular shaft misalignment in a horizontal plane, relative to bulkhead 18.

While the apparatus of the subject invention has been shown and described with reference to preferred embodiments, those skilled in the art will readily appreciate that various changes and/or modifications may be made thereto without departing from the spirit and scope of the subject invention as defined by the appended claims.

What is claimed is:

1. A bearing hanger assembly comprising:
   a) a mounting assembly for connecting the bearing hanger assembly to a supporting structure, the mounting assembly including opposed outer support sections;
   b) a bearing assembly for supporting axial rotation of coupled shaft components, the bearing assembly having an inner race and an outer race;
   c) a flexible diaphragm plate having an inner peripheral portion and an outer peripheral portion, the outer peripheral portion of the diaphragm plate supported between the opposed outer support sections of the mounting assembly, the inner peripheral portion of the diaphragm plate operatively connected to the outer race of the bearing assembly so as to accommodate misalignment of the coupled shaft components relative to the supporting structure; and d) a housing having opposed housing portions abutting the outer race of the bearing assembly and a secured to opposed side surfaces of the inner peripheral portion of the diaphragm plate to operatively connect the diaphragm plate to the bearing assembly.

2. A bearing hanger assembly as recited in claim 1, wherein the inner race of the bearing assembly is operatively connected to a shaft coupling.

3. A bearing hanger assembly as recited in claim 1, wherein the diaphragm plate is solid and has a contoured medial portion.

4. A bearing hanger assembly as recited in claim 3, wherein the contoured medial portion of the diaphragm plate has a dual tapered profile.

5. A bearing hanger assembly as recited in claim 1, wherein the mounting assembly includes opposed leg portions for mounting the bearing hanger assembly to the supporting structure.

6. A bearing hanger assembly comprising:
a) a mounting assembly for mounting the bearing hanger assembly to a supporting structure, the mounting assembly including opposed outer support rings;
b) a bearing assembly for supporting axial rotation of coupled shaft components, the bearing assembly having an inner race and an outer race;
c) a flexible diaphragm plate having a radially inner peripheral hub portion operatively connected to the outer race of the bearing assembly and a radially outer peripheral rim portion supported between the opposed outer support rings of the mounting assembly, so as to accommodate misalignment of the coupled shaft components relative to the supporting structure; and
d) a housing having opposed housing portions compressively engaging the outer race of the bearing assembly and secured to opposed side surfaces of the radially inner peripheral hub portion of the diaphragm plate to operatively connect the radially inner peripheral hub portion of the diaphragm plate to the outer race of the bearing assembly.

7. A bearing hanger assembly as recited in claim 6, wherein the inner race of the bearing assembly is operatively connected to a shaft coupling.

8. A bearing hanger assembly as recited in claim 6, wherein the diaphragm plate is solid and has a contoured medial portion.

9. A bearing hanger assembly as recited in claim 8, wherein the contoured medial portion of the diaphragm plate has a dual tapered profile.

\* \* \* \* \*